United States Patent

Blaimschein

[11] Patent Number: 5,168,787
[45] Date of Patent: Dec. 8, 1992

[54] APPARATUS FOR TRIMMING THREE-DIMENSIONAL WORKPIECES

[75] Inventor: Gottfried Blaimschein, Steyr, Austria

[73] Assignee: GFM Gesellschaft fur Fertigungstechnik und Maschinenbau Aktiengesellschaft, Steyr, Austria

[21] Appl. No.: 723,930

[22] Filed: Jul. 1, 1991

[30] Foreign Application Priority Data

Jul. 13, 1990 [AT] Austria .................. 1492/90

[51] Int. Cl.$^5$ .......................... B26D 7/02; B26D 7/20
[52] U.S. Cl. ........................ 83/465; 83/451; 83/477.2; 83/914; 269/21; 269/295; 269/909
[58] Field of Search ........... 83/451, 914, 465, 100, 83/477.2, 76.1, 76.2, 455; 269/909, 21, 295

[56] References Cited

U.S. PATENT DOCUMENTS

| | | | |
|---|---|---|---|
| 3,172,327 | 3/1965 | Hazzard | 83/914 X |
| 3,354,769 | 11/1967 | Abramson et al. | 83/455 |
| 4,096,777 | 6/1978 | Adams | 83/455 X |
| 4,106,379 | 8/1978 | Spengler | 83/437 X |
| 4,273,738 | 6/1981 | Spengler | 83/456 X |
| 4,277,996 | 7/1981 | Spengler | 83/465 X |
| 4,485,712 | 12/1984 | Gerber | 83/451 |
| 4,516,451 | 5/1985 | Takeshita et al. | 83/455 X |
| 4,827,679 | 5/1989 | Earle, III | 83/53 X |
| 4,979,411 | 12/1990 | Murasaki et al. | 83/701 X |
| 5,054,193 | 10/1991 | Ohms et al. | 269/21 X |

Primary Examiner—Frank T. Yost
Assistant Examiner—Kenneth E. Peterson
Attorney, Agent, or Firm—Kurt Kelman

[57] ABSTRACT

An apparatus for trimming three-dimensional workpieces made, e.g., of plastic comprises a bottom platen for supporting the workpieces and a cutter, which is movable relative to the bottom platen along a line of cut. To permit an automatic trimming by means of an inserted-tooth cutter, the bottom platen extends across the line of cut to support also that portion of the workpiece which is to be trimmed off. The bottom platen has a top surface for supporting the workpiece and is formed with a groove extending along the line of cut.

4 Claims, 1 Drawing Sheet

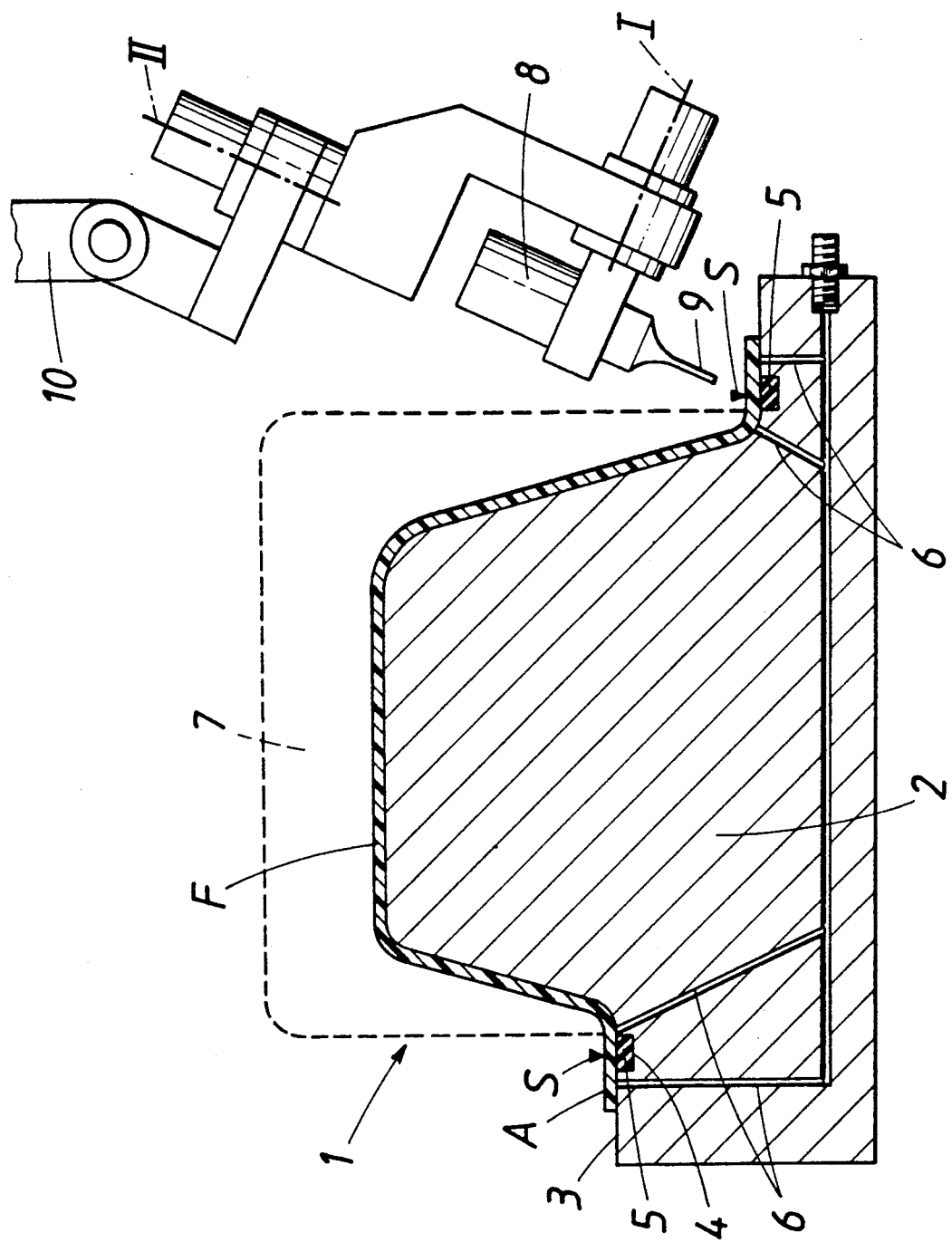

5,168,787

APPARATUS FOR TRIMMING THREE-DIMENSIONAL WORKPIECES

BACKGROUND OF THE INVENTION

1. Field of the Invention

This invention relates to an apparatus for trimming three-dimensional workpieces made of plastic or other materials, comprising a bottom platen for supporting the workpiece and a cutter, which is movable relative to the bottom platen along a line of cut.

2. Description of the Prior Art

Three-dimensional workpieces made of plastic, fiber-reinforced material, rubber or composite material, are used in various industries, for instance, as covering parts and instrument panel parts in vehicles. When said workpieces have been molded they must be trimmed so that they will have neat edges and specified dimensions. But the properties of the materials employed and the three-dimensional shape of the required lines of cut have previously given rise to substantial difficulties in the trimming of such three-dimensional workpieces. A knife used for trimming must still be operated by hand and this is unsatisfactory in industrial operations because of the high labor cost and of the inaccuracy involved. On the other hand, an automatic trimming can be performed by means of a water jet or laser because only weak cutting forces will be exerted on the workpiece in such trimming operations and it will be sufficient to support the workpiece in that it is simply placed on a suitably designed bottom platen. By means of the water jet or laser beam, that edge portion by which the three-dimensional workpiece protrudes over that edge of the bottom platen which extends along the line of cut can be severed without a need for an additional support so that the desired trimming will be achieved in that the cutter is simply moved along the predetermined line of cut. On the other hand, water jet cutting will require a rather complicated water-collecting system and involves a nozzle wear so that the operation involves high costs and a frequent servicing and noise must also be tolerated. In laser cutting the laser is accommodated in the cutter so that complicated means for directing the laser beam will be required. Besides, the high temperatures will result in changes of the material of the workpiece on the cut surface and the burning of the material of the workpiece during the cutting operation may result in a production of a gas, which is deleterious to health.

SUMMARY OF THE INVENTION

It is an object of the invention to eliminate said disadvantages and to provide an apparatus which is of the kind described first hereinbefore and which by the use of relatively simple means permits three-dimensional workpieces to be automatically trimmed mechanically by means of a knife.

That object is accomplished in accordance with the invention in that the bottom platen extends across the line of cut to permit the use of an inserted-tooth cutter and constitutes a support also for that portion of the workpiece which is to be trimmed off and the bottom platen is formed in its top surface with a groove, which extends under and along the line of cut. As a result, the bottom platen supports the entire workpiece, inclusive of that portion which is to be trimmed off, and regardless of their elastic yieldability the workpieces can satisfactorily be trimmed by means of a knife. The groove extending along the line of cut ensures that the space required for a proper cutting operation will be provided for receiving the knife as it cuts through the wall thickness of the workpiece that is to be trimmed. As a result the workpiece is supported close to the line of cut on both sides thereof so that it can satisfactorily be trimmed whereas a damage to the top surface of the bottom platen will be avoided.

If the groove contains a filler made of elastic material, such as polyurethane, the workpiece will be supported also at the groove and an excellent cut will be ensured even if the workpiece has material properties which are not desirable for a knife cut. In spite of the support provided for the workpiece by the elastic filler the latter permits the tip of the knife to penetrate freely into the elastic filler and will protect the knife and will exert a damping action in the region of the cut. That filler can readily be replaced so that fillers can selectively be employed which have properties that are desirable in view of the nature of the workpieces to be trimmed and the nature of the knife.

Within the scope of the invention the cutter may be mounted on a robot arm for an angular adjustment about two axes which are normal to each other. In that case the knife can be moved along any desired three-dimensional line of cut because the movement of the robot arm or of a corresponding tool carrier arm about the three space axes can be controlled and the additional freedom of movement of the cutter will permit the knife edge to be aligned with any portion of the line of cut. This will permit a fully automatic trimming of any desired workpiece by means of an inserted-tooth cutter.

Particularly desirable cutting conditions will be established if the cutter comprises a knife which is operated to vibrate at an ultrasonic frequency because weaker cutting forces will be exerted during ultrasonic cutting than during the conventional knife cutting. For this reason the means for retaining the three-dimensional part to be cut on the bottom platen need not take up excessive loads.

To retain the workpieces on the bottom platen, the bottom platen may be combined with a top platen so that the workpiece which has been placed on the bottom platen can be clamped between the bottom and top platens. The top platen may consist of a simple holding-down member and different from the bottom platen does not laterally extend across the line of cut but leaves the region of the line of cut on the top of the bottom platen exposed so that said region will be accessible to the cutter. But it will be particularly desirable to provide the bottom platen with passages, which are adapted to be connected to a vacuum source and which open in the top surface of the bottom platen adjacent to the groove so that the workpiece will be retained at the groove by the vacuum. In that case the workpiece can be sucked to and held down on the bottom platen close to the line of cut and this can be achieved by the use of low-cost means. Said passages are suitably provided on both sides of the groove so that the trimmed part and the trimmed off waste will be held in position and the workpiece will firmly be retained during the cutting operation.

BRIEF DESCRIPTION OF THE DRAWING

The drawing is a schematic side elevation showing partly in section an apparatus which embodies the invention.

The apparatus 1 permits a neat and exact automatic trimming of three-dimensional workpieces made of plastic, rubber, fiber-reinforced material or composite material by means of a knife. For that purpose the apparatus 1 comprises a bottom platen 2 for supporting the workpiece F to be trimmed. The bottom platen 2 has a top surface 3, which extends across a predetermined line of cut S and will thus snugly support also the portion A which is to be trimmed off as waste. The top surface 3 of the bottom platen is formed with a groove 4, which extends under and along the line of cut S. As a result, a cutting knife 9 will not be damaged as it cuts through the wall thickness of the workpiece F but can enter the groove 4. The groove 4 contains a filler 5, which is flush with the top surface 3 and consists of elastic material, so that the workpiece F will be supported also at the line of cut whereas the cutting operation will not adversely be affected.

The workpiece F is retained on the bottom platen 2 by means of passages 6, which are connected to a vacuum source and open in the top surface 3 of the bottom platen 2 close to the groove 4 and during the trimming operation suck the workpiece F against the top surface 3 of the bottom platen 2 exactly in a predetermined position. If stronger cutting forces are to be exerted, it will be possible to provide a top platen 7, which is indicated by broken lines and can be forced down against the bottom platen 2 to clamp the workpiece F against the bottom platen 2. That top platen 7 will terminate short of the groove 4 so that the line of cut S will freely be accessible to the cutter.

The trimming operation is performed by means of an inserted-tooth cutter 8, which comprises a knife 9, which is preferably operable to vibrate at an ultrasonic frequency so that the knife can be moved in a very exact manner and will exert only small forces tending to move the workpiece out of position. To permit the cutter 8 to follow any desired three-dimensional line of cut, the cutter 8 is mounted on a robot arm 10 for an angular adjustment about two axes I and II, which are normal to each other, whereas the robot arm 10 is capable of a controlled movement about three axes so that the automatic cutting apparatus can be controlled about five axes and will permit a satisfactory and fully automatic trimming of the workpieces F which are snugly supported throughout their surface facing the bottom platen 2.

I claim:

1. An apparatus for trimming an edge of a workpiece having a three-dimensional surface along a predetermined line of cut to remove a waste portion from the workpiece edge, which comprises
   (a) a bottom platen having a three-dimensional top surface conforming to the workpiece surface and including a planar support face for the workpiece edge and the waste portion, the top surface being adapted to support the three-dimensional workpiece surface including the workpiece edge and the waste portion in a position in which the line of cut extends between the workpiece edge and the waste portion,
      (1) the planar support face defining a groove extending under and along the predetermined line of cut,
   (b) an inserted-tooth cutter movable relative to, and over, the planar support face to cut through the workpiece edge along the line of cut whereby the waste portion is removed, and
   (c) an actuator connected to the cutter for moving the cutter in three dimensions along the line of cut,
      (1) the actuator being a robot arm holding the cutter and permitting an angular adjustment of the cutter about two axes extending perpendicularly to each other.

2. The edge trimming apparatus of claim 1, further comprising an elastic material filler in said groove and flush with the planar support face.

3. The edge trimming apparatus of claim 2, wherein the elastic material is polyurethane.

4. The edge trimming apparatus of claim 2, wherein the filler is detachably held in the groove.

* * * * *